United States Patent
Bell et al.

(10) Patent No.: US 7,770,030 B2
(45) Date of Patent: *Aug. 3, 2010

(54) CONTENT GUARD SYSTEM FOR COPY PROTECTION OF RECORDABLE MEDIA

(75) Inventors: Alan Edward Bell, San Jose, CA (US); Jeffrey Bruce Lotspiech, San Jose, CA (US); Chandler Brendan Stanton Traw, Portland, OR (US)

(73) Assignees: International Business Machines Corporation, Armonk, NY (US); Intel Corporation, Santa Clara, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 12/052,083

(22) Filed: Mar. 20, 2008

(65) Prior Publication Data

US 2008/0181410 A1 Jul. 31, 2008

Related U.S. Application Data

(63) Continuation of application No. 10/770,051, filed on Feb. 2, 2004, now Pat. No. 7,380,137, which is a continuation of application No. 09/358,162, filed on Jul. 20, 1999, now Pat. No. 6,832,319.

(51) Int. Cl.
G06F 12/14 (2006.01)
H04N 7/167 (2006.01)

(52) U.S. Cl. ................ 713/193; 380/228; 380/230; 380/234; 380/241

(58) Field of Classification Search ............... None
See application file for complete search history.

(56) References Cited

U.S. PATENT DOCUMENTS 5,796,824 A * 8/1998 Hasebe et al. .................. 705/51
6,118,873 A * 9/2000 Lotspiech et al. ........... 380/277

(Continued)

*Primary Examiner*—Kaveh Abrishamkar
(74) *Attorney, Agent, or Firm*—John L. Rogitz (57) ABSTRACT

A system and method for enabling broadcast programs to be copied once only by consumer recorders includes writing a unique media identification on each blank disk to which content is to copied in a read-only area of the disk before it is initially recorded. Also, a one-way key management media key block is written to the disk. A content key is derived by combining a media key, derived from the media key block, with the media identification. Additionally, to facilitate copying the content one time only, an exchange key is established between the recorder and a sender such as a satellite receiver or a disk player that is associated with the recorder, and the exchange key is modified with one or more special numbers representing control commands including copy once and copy no more. The modified exchange key is then encrypted using the content key to render an encrypted modified exchange key, and the encrypted modified exchange key is then hashed with a nonce to render a bus content key. The bus content key is then used to encrypt the data for copying the data to a disk. Unauthorized attempts to copy the data after the first authorized copy has been made cannot succeed because the media ID is different on subsequent blank media. Further, if illegal clones are manufactured that can calculate the media key, new blank media can change the media key block such that the clones can no longer calculate the correct media key. Authorized players, however, can decrypt the data to display it.

7 Claims, 5 Drawing Sheets

U.S. PATENT DOCUMENTS

| | | | |
|---|---|---|---|
| 6,209,092 B1 * | 3/2001 | Linnartz | 713/176 |
| 6,609,116 B1 * | 8/2003 | Lotspiech | 705/57 |
| 6,775,779 B1 * | 8/2004 | England et al. | 726/26 |
| 6,832,319 B1 * | 12/2004 | Bell et al. | 713/193 |
| 7,380,137 B2 * | 5/2008 | Bell et al. | 713/193 |

* cited by examiner

CONTENT GUARD SYSTEM FOR COPY PROTECTION OF RECORDABLE MEDIA

This application is a continuation of allowed U.S. patent application Ser. No. 10/770,051 filed Feb. 2, 2004, now U.S. Pat. No. 7,380,137, which is a continuation of application Ser. No. 09/358,162, filed Jul. 20, 1999, now U.S. Pat. No. 6,832,319, from which priority is claimed.

BACKGROUND OF THE INVENTION

1. Field of the Invention

The present invention relates generally to broadcast data encryption, and more particularly to the encryption of recordable media to permit the media to be copied once only.

2. Description of the Related Art

The advantages of digitized video and music are numerous, but one significant drawback is that being digitized, the content is relatively easy to copy perfectly, without authorization of the copyright owner. Copies can be made of digital audio and video content that is broadcast to in-home receivers over a network such as, for example, Home Box Office (HBO), or that is provided to in-home users on media such as digital video disks (DVDs). Indeed, widespread copying by pirates costs content owners billions of dollars per year. Thus, the present invention understands that it is desirable to limit the unauthorized copying of digital audio and video.

The problem, however, is complicated by the desire of governmental bodies mid consumer protection lobbies to permit a buyer of digitized content to make a single copy for archive purposes or other legitimate reasons. Accordingly, the problem addressed by the present invention is how to enable a buyer to copy a broadcast program, but once only. It is to be understood that while today the requirement is to make only one copy, in the future the requirement might be to allow two or more copies. It is to be further understood that any solution solving the "copy once" requirement could be trivially extended to any specified number of copies; the invariant feature of any solution is to make sure that a copy cannot be further copied For convenience and clarity, the present disclosure assumes that only one copy is to be made, it being understood that limiting the number of permissible copies to any finite number is within the scope of the present invention.

To better understand the problem, if every recorder in the world were an authorized, properly programmed recorder, a broadcast program could simply contain an unencrypted signal indicating "copy once", and each recorder used for copying would duly copy the content and append an unencrypted message to the copy indicating "copy no more". Any player could play the copy, but any recorder sought to be used to recopy the content would obey the "copy no more" message, protecting the rights of the content owner.

Of course, pirate recorders can be constructed that do not obey such procedural messages. Consequently, a cryptographic approach must be used to prevent unauthorized usable copies from being made. One approach recognized herein is to provide each authorized recorder with its own secret key, which the recorder would use to encrypt the content. Unfortunately, the media so recorded could be played back only on the player that is associated with the recorder that made the copy, so this approach is unacceptable in the consumer market.

Alternatively, the present invention understands that a single secret key could be provided to all recorders, which would then use the key to encrypt the content as it is recorded. In this way, any authorized recorder that includes a player could play back the recording, regardless of where the recording was made, and authorized recorders could be programmed to copy any broadcast program only once. Current DVD encryption methods use this approach. The drawback with this method is that it is cryptographically fragile—once the system secret is discovered by an unauthorized person, it can be disseminated to unauthorized pirate recorders that could use the key to copy the content thousands of times, unencumbered by what amounts to a promise to copy a broadcast program only once, and thereby defeat the system.

As recognized herein, a one-way key management scheme can be used which has a good key management method to address the above-noted problem of unauthorized recorders being provided with a stolen system key. One-way key management is a cryptographic protocol in which two parties can agree upon a key without having two-way communication. Good one-way key management protocols also have the feature that illegal clones that have some of the secrets in the protocol nonetheless can be excluded from interoperating from the legitimate devices. One such system is disclosed in IBM's co-pending U.S. patent application Ser. No. 09/065,938, filed Apr. 24, 1998 for an invention entitled "System for Encrypting Broadcast Programs in the Presence of Compromised Receiver Devices", incorporated herein by reference. However, such a system, in and of itself, is not sufficient to address the current problem. This is because a pirate, although unable to discover the key and decrypt the data in the broadcast program or on the DVD, can simply make a bit-for-bit copy of the encrypted data. The pirate recorder itself could not decrypt and play the data, but any legitimate recorder-player would be capable of decrypting and playing the unauthorized copy, thus making the copy salable.

The present invention has carefully considered the above considerations and has addressed the noted problem.

SUMMARY OF THE INVENTION

A system is disclosed for once-only copying of data representative of video and/or audio to one of a plurality of data storage media. Each data storage medium includes a respective media identification written to an ID location on the medium, and each medium also includes a common one-way key management media key block. In accordance with the present invention, the system includes a program of instructions that include structure for undertaking method acts including, for each medium, determining a media key from the common one-way key management media key block. Also, the present method acts include combining the media key with the media identification to render a content key, and then encrypting the data using the content key for copying of the encrypted data onto a data storage medium.

Preferably, a player-recorder establishes a player and a recorder, and the player-recorder undertakes method acts including sending encrypted data from the data storage medium to the player. The media identification and media key block on the data storage medium are read by the player. Then, the media key is determined using the media key block, and the content key determined using the media key and the media identification. With the content key, the player decrypts the data to facilitate the player playing video and/or audio represented by the data.

As envisioned by the present invention, to facilitate copying the data storage medium one the only, the method acts can further include establishing an exchange key between the recorder and a sender selected from the group of senders including: the player, and a broadcast program receiver. The exchange key is then modified with one or more special numbers to render a modified exchange key, with the special numbers representing the group of control commands including: copy once, and copy no more. Moreover, the method acts include encrypting the modified exchange key using the content key to render an encrypted modified exchange key, and using the encrypted modified exchange key or a derivative thereof to encrypt the data for copying thereof to the data storage medium. In a particularly preferred embodiment, the encrypted modified exchange key is hashed with a nonce to render a bus content key, with the bus content key then being used to encrypt the data for copying thereof to the data storage medium.

The preferred one-way key management scheme can include accessing plural computer-usable device keys selected from a set of device keys. The media key block is generated by encrypting plural media numbers with the set of device keys, with at least one of the media numbers being a dummy number when it is determined that at least one recorder is a compromised recorder defining compromised device keys. Under these circumstances, the dummy number is encrypted by at least one compromised device key. The recorder determines the media key based on the media key block and the respective device keys, such that the media key is usable to decrypt the data unless the dummy number is used to generate the media key.

As disclosed in the above-referenced patent application, the set of device keys is representable by at least a two-dimensional matrix including a key dimension and a sets dimension. The key dimension represents "N" key positions each represented by a key index variable "i", and the sets dimension represents "M" sets each represented by a sets index variable "j", such that each device key can be represented by $S_{j,i}$. In the preferred encryption scheme, no two device keys of a recorder have the same key index variable "i" as each other.

A respective media number is provided for each key index variable "i" such that each media number can be represented by $x_i$. Each media number $x_i$ is encrypted only by device keys in the $i^{th}$ key dimension. Each recorder uses its respective $i^{th}$ device key $S_{j,i}$ to decrypt the $i^{th}$ media number, such that all recorders not having the compromised device key generate at least a first media key and all recorders having the compromised device key generate at least a second media key, only the first media key being useful in decrypting the data.

Furthermore, recorders generating the first media key define at least a first pool and recorders generating the second media key define at least a second pool, and renewal data is sent to the recorders in the first pool when all recorders in the first pool are not compromised. The recorders in the first pool operate on the renewal data to generate new device keys. In contrast if recorders in the second pool are not compromised recorders, the recorders in the second pool are caused to generate a new media key. Still further, a first set of non-compromised recorders defines a first pool and a second set of non-compromised recorders defines a third pool such that each of the first and third pools do not contain any compromised recorder, Recorders in the first pool are caused to replace their media key with the media key of the recorders in the third pool.

In another aspect, a computer is disclosed that includes a program of instructions for causing a media manufacturing machine to write, onto each blank media device of a plurality of blank media devices, at least one computer-readable media identification and at least one computer-readable one-way key management data block. As envisioned herein, the media identification of a media device subsequently can be combined with at least one key derived from the encryption data block to render a content key for use in encrypting data to be recorded on the media device.

In still another aspect, a computer-implemented method for enabling data to be copied one time only onto a media device includes writing at least one media identification and at least one one-way key management key block onto the media device. At least the media identification is written in a read-only area. A media key is derived from the media block and combined with the media identification to render a content key. Then, an exchange key is established between a recorder and a sender having access to the data, Desirably, the exchange key is modified using at least one special number representing a copy command to render a modified exchange key, which is then encrypted using the content key to render an encrypted modified exchange key. Using the encrypted modified exchange key or a hash thereof, the data is encrypted for copying the encrypted copied data once only to a copy media device, such that the encrypted copied data can be decrypted and displayed but not recopied without access to the special number.

In yet another aspect, a recorder computer program storage device includes a program of instructions for writing data representative of video and/or audio to a digital disk, with each disk including a respective media identification written to an ID location on the disk. The disks also include a common one-way key management media key block, and the program of instructions includes computer readable code means for, for each disk, determining a media key from the common one-way key management media key block. Further, computer readable code means combine the media key with the media identification to render a content key. Also, computer readable code means for encrypt the data using the content key for recordation of the encrypted data on the disk.

In another aspect, a user computer program storage device is accessible by a player-recorder establishing a player and a recorder. As disclosed in detail below, the user computer program storage device includes computer readable code means for sending encrypted data from a data storage medium to the player. Computer readable code means read a media identification and a media key block on the data storage medium, and computer readable code means then determine a media key using the media key block. Additionally, computer readable code means determine a content key using the media key and the media identification, such that computer readable code means can decrypt data on the data storage medium using the content key to facilitate the player playing video and/or audio represented by the data.

In still another aspect, a blank data storage disk is provided for recording digital data thereon. As intended by the present invention, the blank data storage disk includes a media identification that is substantially unique to the disk. Also, the blank storage disk includes a media key block for facilitating copy-once recording.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
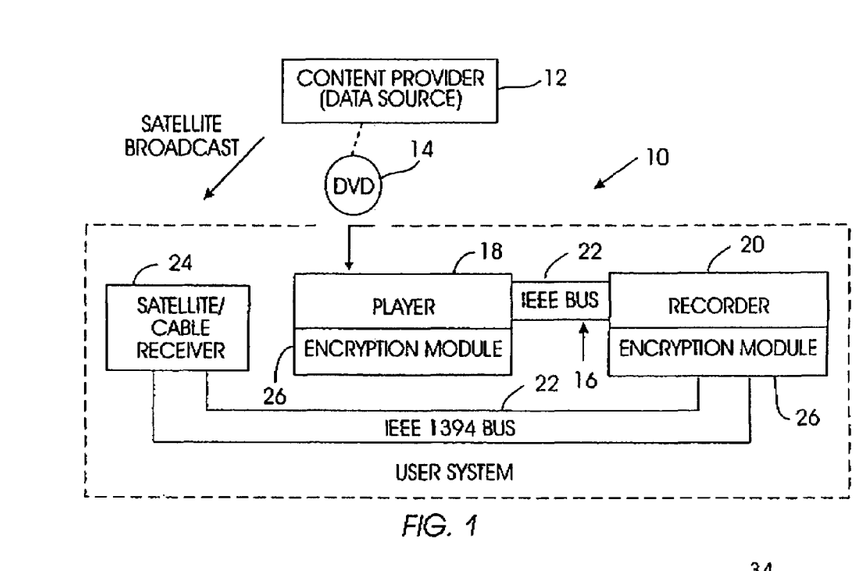
FIG. 1 is a block diagram of the present system.

Referring initially to FIG. 1, a system for broadcasting programs for copy-once recording is shown, generally designated 10. By "broadcast" is meant the wide dissemination of a program from a content provider 12 to many users simultaneously over cable (from a satellite source), or wire, or radiofrequency (including from a satellite source), or from widely marketed DVDs 14. In the particular architecture shown, the system 10 includes plural player-recorders 16 (only one player-recorder 16 shown for clarity of disclosure) that are owned and operated by consumers. Each player-recorder 16 includes a player 18 that can display data stored on the DVD 14, and a recorder 20 that communicates with the player 18 via a bus 22. The bus 22 is preferably an IEEE 1394 bus. Also, the recorder 20 communicates, via the bus 22, with a receiver 24. The receiver 24 can be, e.g., a cable set-top box that receives cable programming originally broadcast via satellite, or the receiver 24 can be satellite receiver for directly receiving such programming from a satellite.

It is the purpose of the present invention to enable authorized user systems to copy, once only, data that is received from either the receiver 24 or from the DVD 14 via the player 18. To this end, an encryption module 26 is accessible by both the player 18 and the recorder 20, either one or both of which are controlled by a digital processing apparatus. In one intended embodiment, the digital processing apparatus is included as a digital signal processor (DSP) or application specific integrated circuit (ASIC) chip or other digital processing circuitry in the player-recorder 16. Other digital processors, however, may be used, such as a personal computer or laptop computer made by International Business Machines Corporation (IBM) of Armonk, N.Y., or any other suitable processing apparatus. In any case, the processor of the player-recorder 16 accesses the encryption module 26 to undertake the logic shown and discussed below, which may be executed by a processor as a series of computer-executable instructions.

Figure 2:
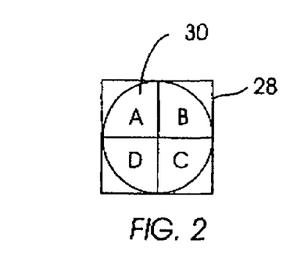
FIG. 2 is a schematic diagram of a computer program product.

The instructions may be contained on a data storage device with a computer readable medium, such as a computer diskette 28 shown in FIG. 2 having a computer usable medium 30 with code elements A-D stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code.

Indeed, the flow charts herein illustrate the structure of the modules of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Figure 3:
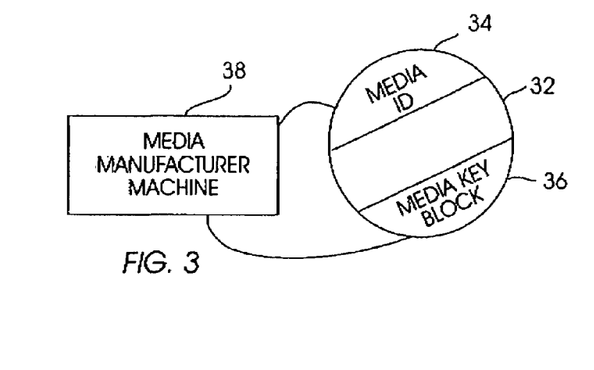
FIG. 3 is a schematic diagram of a media manufacturing machine writing a media identification and a media key block to a blank disk.

The logic of the present invention permits the broadcast data to be copied once only, preferably onto a blank data storage media device such as a disk 32 shown in FIG. 3. The disk 32 is obtained by a user in a substantially blank format, except for a media identification 34 and a media key block 36 which are written onto the disk 32 during manufacture by a media manufacturing machine 38.

In the preferred embodiment, details of the media key block 36 are disclosed in the above-referenced patent application, and summarized briefly below. In the above-referenced patent application, the present media key block 36 is referred to as the "session key block".

Turning to the media identification 34, the media identification 34 is preferably written to a read-only area. "Read-only area" also includes encoding the media identification in a read-only format on the disk 32. Examples of read-only areas include a non-addressable sector of the disk 32 and a burst cut area of the disk 32. An example of a read-only format includes inserting the media identification 34 in "wobbles" that have been deliberately inserted in tracks of the disk 32. Another example of a read-only format includes varying the pit code of the disk 32.

In accordance with the present invention, the media key block 36 is the same for a large batch of disks 32, which periodically can be changed for a subsequently manufactured batch of disks to combat attacks as discussed further below. In contrast, each disk 32 includes a media identification 34 that is unique to the disk 32, or substantially so. By "substantially unique"/media identification means that actual media identifications can be as little as sixteen bits long, so that occasionally two randomly selected blank disks might have the same media identification.

Figure 4:
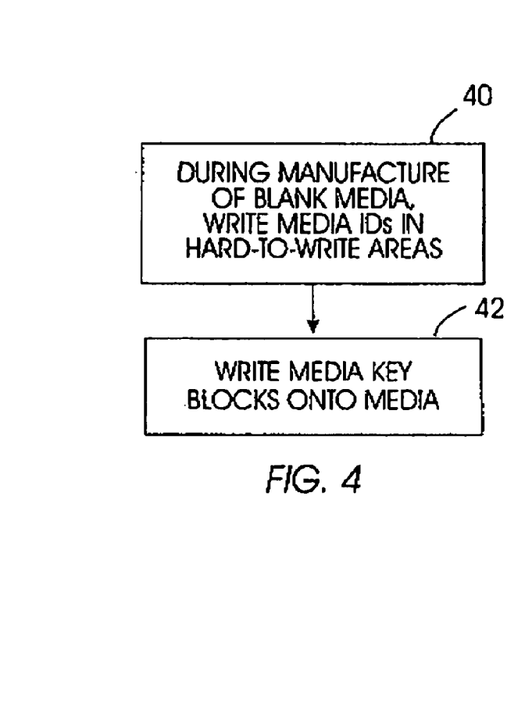
FIG. 4 is a flow chart of the steps for preparing a blank disk.

This process is shown in FIG. 4. Commencing at block 40, the media identifications are written to read-only areas on the disks 32. Moving to block 42, the media key block is written to all blank disks 32.

Figure 5:
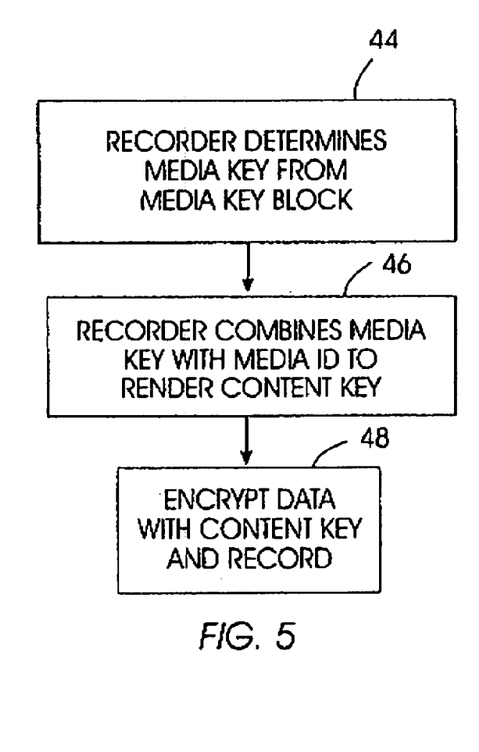
FIG. 5 is a flow chart of the steps for copy-once recording.

When it is desired to copy a broadcast program or DVD, the process undertakes the logic shown in FIG. 5. Commencing at block 44, the recorder 20 determines a media key from the media key block, preferably using the one-way key management principles set forth in the above-referenced patent application. As set forth in the above-referenced application, all legitimate recorders 20 determine the same media key, although they determine it in different ways.

Proceeding to block 46, the recorder combines the media key with the media identification of the disk 32 to which the data is to be copied. All methods of combination are contemplated herein; in an exemplary embodiment, the media identification is concatenated with the media key and the result then cryptographically hashed using the Secure Hashing Algorithm (SHA), The result that is rendered by the above steps is a content key, and the content key (or, more preferably, a key derived from it) is used to encrypt the data to be copied onto a blank disk 32. In any case, the content key is "used" to encrypt the data at block 48, which is then recorded onto a blank disk 32.

With the above in mind, it may now be appreciated that owing to the present invention, although both the media identification and media key block of a blank disk 32 can be read by an unauthorized copyist, the unauthorized copyist cannot correctly calculate the media key from the media key block and thus cannot correctly calculate the content key. If the unauthorized copyist makes a bit-for-bit copy onto the new blank disk 32, the media identification on the new disk 32 will be different, and players 22 will calculate the wrong content key, such that the audio or video data will not be properly displayed.

If desired, each recorder 20 can also write its own unique identification onto the disk 32 when the encrypted data is recorded thereon, and to include the recorder identification in the content key hash. This provides additional policing capability in case a large-scale pirate uses a single recording as a master for producing ROM duplications.

Figure 6:
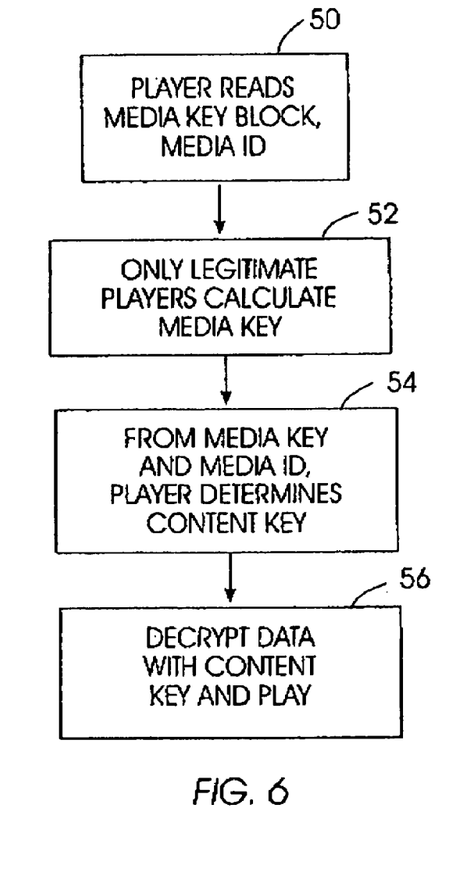
FIG. 6 is a flow chart of the steps for playing the copy.

When it is desired to play the encrypted data on the disk 32, the player 18 undertakes the logic shown in FIG. 6. Commencing at block 50, the player reads the media key block and media identification on the disk 32. Proceeding to block 52, only legitimate players 22 can calculate the media key, as mentioned above. Next moving to block 54, the player 18 uses the media key and media identification in accordance with previous disclosure to determine the content key (or its derivative described below). Then, at block 56 the player 18 decrypts the data using the content key (or its derivative) to display the data.

Figure 7:
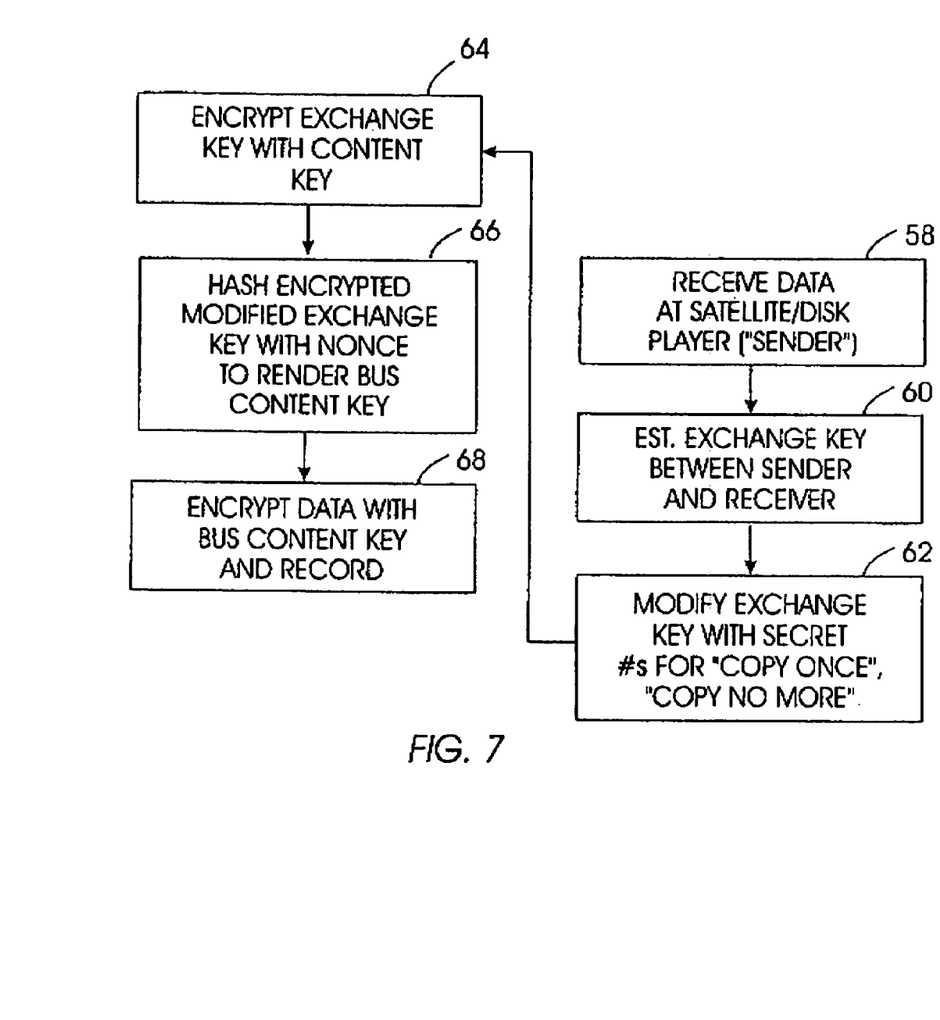
FIG. 7 is a flow chart of the steps for establishing a bus content key.

Having described the overall one-way key management scheme of the present invention for encrypting copied broadcast data prior to recording the data on disk, attention is now directed to FIG. 7, which shows the logic for calculating a derivative of the content key to compel copy-once restrictions of broadcast data. Commencing at block 58, copy-once broadcast data is received at the receiver 24 or player 18. Either one of these components can be regarded as a "sender". The data received indicates whether it is to be copied once, and the discussion below assumes that the data so indicates.

Moving to block 60, an exchange key is established between the sender and the receiver of data, which for present purposes is the recorder 20. Proceeding to block 62, the exchange key is modified using special numbers which are preferably but not necessarily secret. The special numbers, preferably known only to authorized devices, represent the control commands "copy once" and "copy no more". Accordingly, when the data received indicates that it may be copied once only, at block 62 the special number for "copy no more" can be subtracted from the exchange key, and the special number for "copy once" can be added to the exchange key, it being understood that other methods of modifying the exchange key with the special numbers are within the scope of the present invention.

From block 62, the logic moves to block 64, wherein the modified exchange key is encrypted with the content key. Preferably, the modified exchange key and content key have the same length, so that an exclusive or determination can be made to encrypt the exchange key with the content key.

After encrypting the modified exchange key with the content key, the process moves to block 66 to hash the encrypted modified exchange key with a nonce to render a bus content key. The bus content key encrypts the data at block 68 and the data is then recorded onto the disk 32. It may now be appreciated that the content key is used to encrypt the data, in that the bus content key is derived form the content key.

Accordingly, a codified "copy no more" command is inserted into the present encryption key that is used to encrypt the data recorded on the disk 32. Also, an unencrypted "copy no more" command can be written to the disk 32, which will be obeyed by legitimate recorders. Legitimate players that know the special numbers can determine the bus content key using the principles set forth above to decrypt and display the audio or video data. Unauthorized recorders, on the other hand, are compelled to observe the "copy no more" command owing to the codified "copy no more" command embodied in the incorporation of the special numbers into the bus content key. Indeed, were an authorized copy of a "copy no more" recording to be attempted, the unauthorized copy would not be decryptable, owing to the special number strategy discussed above.

For a full understanding of the details of the preferred one-way key management scheme and how it can be used to defeat unauthorized copyists, reference is made to the above-referenced patent application. To summarize the preferred one-way key management logic set forth therein, however, reference is now made to FIGS. 8-10.

In accordance with the principles of the above-referenced invention, each user player-recorder 16 is provided with plural device keys. Each device key is a random number of predetermined bit size, with the predetermined bit size of the presently preferred embodiment being sixty four (64). The device keys of a particular player-recorder 16 are accessible to the respective module 26, and the entire set of device keys used in the system 10 are accessible to a system encryption module for purposes to be shortly disclosed. A list of the respective subset of device keys that is given to each player-recorder 16 can be kept by a licensing agency.

The set of device keys can be represented by a two-dimensional matrix. Accordingly, the device keys can be denoted by the symbol $S_{j,i}$, wherein i=the integers from 1 to N inclusive and j= the integers from 1 to M inclusive. In accordance with present principles, "i" is a key index variable and "j" is a sets index variable.

As intended by the above-referenced application, each user player-recorder 16 is assigned selected keys "S" from the matrix by the licensing agency. For example, a first user player-recorder 16 might be assigned the keys $S_{3,1}$, $S_{5,2}$, $S_{1,3}$, $S_{1,4}$, $S_{6,5}$, $S_{4,6}$, and $S_{8,7}$. In any case, each user player-recorder 16 is assigned "N" device keys, and each player-recorder 16 is assigned one and only one device key "S" for each key index variable "i". Embodiments, however, wherein a device might not include a device key for each and every $i^{th}$ position are within the scope of the above-referenced invention. In any case, no single player-recorder 16 learns two keys at the same position in the key index dimension. Preferably, no player-recorder 16 has exactly the same device keys "S" as any other device, although the device keys of many devices might overlap.

Figure 8:
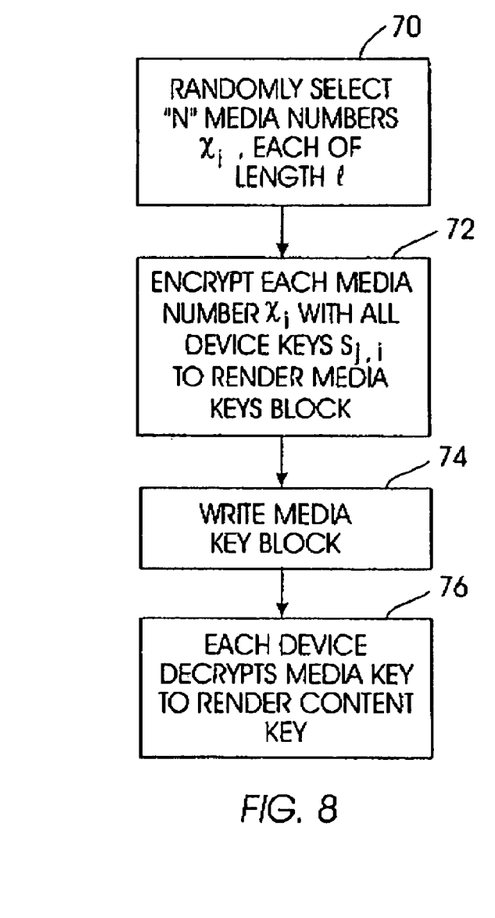
FIG. 8 is a flow chart of the logic for encrypting, transmitting, and decrypting to user devices a session key for use in the subsequent decryption of broadcast programs.

Once the device keys "S" of the player-recorders 16 have been assigned and the player-recorders 16 placed in use, programs, including digital video programs, can be encrypted using the logic shown in FIG. 8. Commencing at block 70, "N" media numbers "$x_i$" are randomly generated, each media number having a length "l". In one preferred embodiment, the length "l" of each media number "x" is sixty four (64) bits. Then, at block 72 each media number $x_i$ is encrypted "M" times, once with each in device key $S_{j,i}$, j=1 to M, to render "M" versions of the media number $x_i$. The result of block 72 is a matrix that defines the media key block.

Moving to block 74 in FIG. 8, as described above the media key block is written to each blank disk 32. When a player-recorder 16 is at the appropriate renewal generation number described in the above-referenced application, the logic moves to block 76. At block 76, the player-recorder 16 decrypts the media key from the media key block for in turn decrypting the content key. To do this, the player-recorder 16 uses its device keys $S_{j,i}$, i=1 to N, to decrypt the respective $i^{th}$ media numbers $x_i$. Each device then hashes all of the decrypted media numbers, e.g., by using an XOR operation on all of the media numbers, to render a media key. Thus, the player-recorders 16 calculate the same media key, but arrive at it using different device keys "S".

Figure 9:
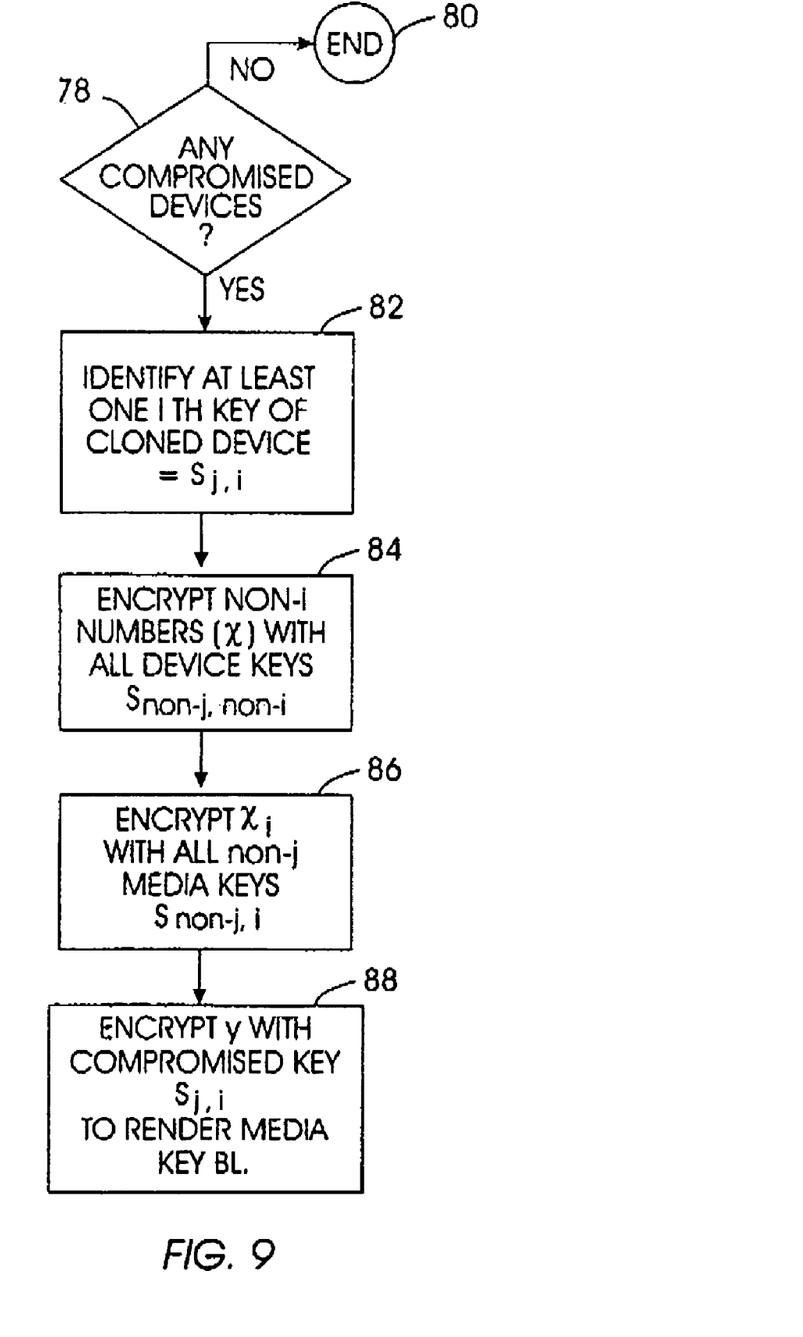
FIG. 9 is a flow chart of the logic for encrypting a predetermined dummy session number using at least one device key that is known to be held by an unauthorized device.
Figure 10:
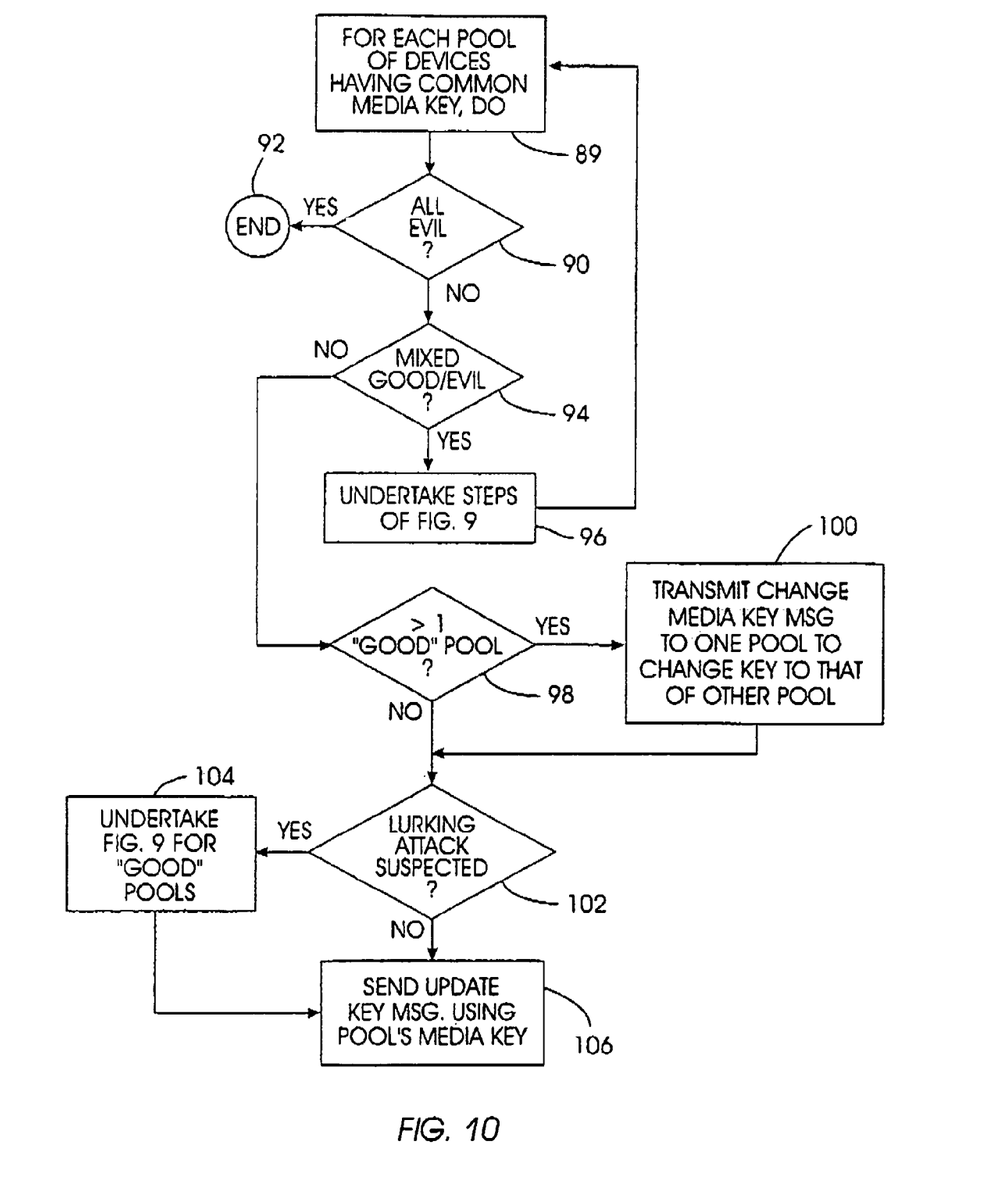
FIG. 10 is a flow chart of logic for processing various pools of devices as described in the above-incorporated U.S. Pat. No. 6,118,873.

The above-referenced application recognizes that one of the player-recorders 16 can be obtained by a so-called "pirate", who could clone the device, along with its device keys, to render one or more unauthorized devices that undesirably could receive and decrypt the program. It is possible for the licensing agency to learn about such unauthorized devices; the challenge met by the invention used in the preferred embodiment is to send a broadcast message to authorized player-recorders that the unauthorized player-recorders cannot read. The logic undertaken by the above-referenced application for doing so is shown in FIG. 9.

Commencing at decision diamond 78, it is determined whether any player-recorders 16 have been compromised, i.e., whether any unauthorized player-recorders exist. If not, the process ends at state 80.

On the other hand, when the licensing agency has determined that at least one player-recorder 16 has been compromised, the agency accesses the subset of device keys that had been assigned to the compromised device, and then proceeds from decision diamond 78 to block 82 to identify at least one key position, e.g., the $i^{th}$ key position, of the compromised device in which the particular device key $S_{j,i}$ that has been assigned to the compromised device resides. It is to be understood that for clarity of disclosure, it is assumed that only a single device key position of the compromised device is selected as described below. The principles below, however, can be applied to select two or more device key positions and process them simultaneously.

Moving to block 84, the logic envisions encrypting all non-i media numbers $x_{non-i}$ with all non-j (relative to the device key $S_{j,i}$ of the compromised player-recorder 16) corresponding device keys $S_{non-j, non-i}$ in accordance with principles discussed above. Also, at block 86 the $i^{th}$ media number $x_i$ is encrypted with all non-j device keys $S_{non-j,i}$. This leaves, as the only media key block matrix element left for encryption, the media number at the location at which the selected compromised device key $S_{j,i}$ happens to be.

Accordingly, at block 88 a number is encrypted using the selected compromised $S_{j,i}$, is but the number is not the $i^{th}$ media number $x_i$. Rather, it is a dummy number "y". A new media key block consequently is rendered after block 88 and used on all subsequent blank media disks 32.

It may now be appreciated that most of the player-recorders 16, which are not expected to possess the selected compromised device key $S_{j,i}$ of the compromised device that occupies the $i^{th}$ position selected, will successfully decrypt all media numbers "x" and, hence, successfully calculate the media key. In contrast, the compromised device will not decrypt the $i^{th}$ media number $x_i$, but instead will decrypt the dummy number "y". Consequently, the compromised device cannot calculate the correct media key, which can be determined only by combining all of the non-dummy media numbers $x_i$, i=1 to N.

With respect to authorized player-recorders that happen to use the particular selected compromised device key $S_{j,i}$, and that, like the compromised device, consequently cannot calculate the correct media key, recall that no authorized device has exactly the same device keys, key for key, as any other authorized device. With this in mind, the above-described procedure is repeated with one or more of the non-i device keys $S_{j,non-i}$ of the compromised device, until all authorized player-recorders have been given a valid media key.

In undertaking the subsequent iterations, the new media key blocks are made conditional. More specifically, the message accompanying new broadcast programs instructs the player-recorders to calculate a new media key only if their existing media key is die key that existed prior to the beginning of the procedure shown in FIG. 9. The skilled artisan will recognize that after each iteration, additional authorized player-recorders can calculate the correct media key, with the pool of player-recorders "left in the dark" growing progressively smaller until only the compromised device and its clones do not have the correct media key. The device key renewal cycles disclosed in the above-mentioned application are not used with the present invention.

While the particular CONTENT GUARD SYSTEM FOR COPY PROTECTION OF RECORDABLE MEDIA as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A blank data storage disk for recording digital data on a computer readable medium thereof, the computer readable medium of the blank data storage disk including a media identification substantially unique to the disk, the computer readable medium of the blank storage disk also including a media key block, for facilitating copy-once recording, wherein the disk is blank in that it is obtainable by an end user in a substantially blank format except for the media identification and the media key block.

2. The disk of claim 1, wherein the media key block represents plural media numbers encrypted with a set of device keys, wherein the set of device keys is representable by at least a two-dimensional matrix including a key dimension and a sets dimension, Wherein the key dimension represents "N" key positions each represented by a key index variable "i", and wherein the sets dimension represents "M" sets each represented by a sets index variable "j", such that each device key can be represented by $S_{j,i}$.

3. The disk of claim 2, wherein no two device keys of a recorder capable of using the disk have the same key index variable "i" as each other.

4. The disk of claim 1, wherein a respective media number is provided for each key index variable "i" such that each media number can be represented by $x_i$, and wherein each media number $x_i$ is encrypted only by device keys in the $i^{th}$ key dimension.

5. The disk of claim 1, wherein at least the media identification is written in a ad-only area.

6. The disk of claim 5, wherein the read-only area is selected from one or more areas in the group of areas consisting of: at least one non-addressable sector of the media device, a burst cut area of the media device, and wobbles inserted in tracks of the media device.

7. A blank data storage disk for recording digital data on a computer readable medium thereof, the computer readable medium of the blank data storage disk including a media identification substantially unique to the disk, the computer readable medium of the blank storage disk also including a media key block, for facilitating copy-once recording, wherein the disk is blank in that it is obtainable by an end user in a substantially blank format except for the media identification and the media key block.

* * * * *